United States Patent [19]

Bögle

[11] Patent Number: 4,625,489

[45] Date of Patent: Dec. 2, 1986

[54] WEDGE FOR USE IN LATTICE SUBSTRUCTURES OF WALL PANELS

[75] Inventor: Ulrich Bögle, Reutlingen, Fed. Rep. of Germany

[73] Assignee: Wilhelm Bögle KG, Reutlingen, Fed. Rep. of Germany

[21] Appl. No.: 816,047

[22] Filed: Jan. 3, 1986

[30] Foreign Application Priority Data

Jan. 30, 1985 [DE] Fed. Rep. of Germany ....... 3502959

[51] Int. Cl.⁴ .............................................. B66F 13/00
[52] U.S. Cl. ..................................... 52/712; 52/126.1; 52/512; 254/104
[58] Field of Search .............. 52/712, 707, 708, 126.1, 52/512; 248/231.3, 188.2; 254/104; D8/47

[56] References Cited

U.S. PATENT DOCUMENTS

| | | | |
|---|---|---|---|
| 2,239,433 | 4/1941 | Urbain | 254/104 |
| 2,431,664 | 11/1947 | Strid | 254/104 X |
| 3,289,373 | 12/1966 | Miller | 52/375 |
| 3,837,625 | 9/1974 | Loov | 52/707 X |
| 4,135,335 | 1/1979 | Jensen | 254/104 |
| 4,269,393 | 5/1981 | Michaud | 254/104 |

FOREIGN PATENT DOCUMENTS

| | | | |
|---|---|---|---|
| 74684 | 7/1932 | Sweden | 254/104 |
| 308234 | 3/1929 | United Kingdom | 254/104 |
| 365751 | 1/1932 | United Kingdom | 52/512 |
| 1190086 | 4/1970 | United Kingdom | 254/104 |

*Primary Examiner*—J. Karl Bell
*Attorney, Agent, or Firm*—Michael J. Striker

[57] ABSTRACT

A wedge for adjusting lattice substructures of wall panels is made of sheet stamping and includes a back wall and at least two side walls which have toothed edges forming wedge surfaces. Transversal walls can be formed at the wider end of the wedge.

18 Claims, 21 Drawing Figures

WEDGE FOR USE IN LATTICE SUBSTRUCTURES OF WALL PANELS

BACKGROUND OF THE INVENTION

The present invention relates to a wedge for lattice substructures of wall panels.

In order to bring supporting lattices of substructures for wall panels or linings in an exact vertical or horizontal position relative to the walls of the buildings, wedges have been utilized, which have been manufactured as solid wedges from wood or plastics. These solid wedges, however, have the disadvantage that they can be easily loosened due to moisture and temperature fluctuations during unvoidable operations of the wooden lattice construction. Solid wedges of synthetic plastic material have the disadvantage that they are quite expensive due to material.

SUMMARY OF THE INVENTION

It is an object of the present invention to provide an improved wedge for adjusting lattices of lattice substructures.

It is another object of the present invention to provide a wedge of the foregoing type, which is inexpensive to make and which would not become loosened and displaced in assembly during the aforementioned operations of the lattice substructure.

These and other objects of the present invention are attained by a wedge for use with lattice substructures of wall panels, comprising side walls and a back wall extending between said side walls, the wedge being bent from a sheet stamping, each side wall having a wedge surface formed at last partially by a bent edge region, each edge region having a toothed edge.

The wedge according to the invention can be manufactured in mass production from sheet material. The toothed edges provide at the side walls of the wedge in assembly engage in a lattice of the wall panel substructure to be adjusted. The production of the wedge of a sheet stamping or blank has a further advantage which resides in that a tip of the wedge can be formed as a sharp knifelike end which can be easily inserted between two tightly adjacent lattices or set tightly on the lattice lying on the smooth wall.

Advantageously the back wall may be formed with corrugations extended transversely relative to a direction of displacement of the wedge.

The wedge may have a U-shaped cross-section and include a base forming said back wall and two legs forming said side walls said side walls terminating with toothed edges, said side walls being normal to said back wall.

In order to facilitate the release of the wedge driven in the lattice substructure during the adjustment of the latter at least one extension wall portion may be formed in the region of the widened end of the wedge for attaching thereto of an adjustment tool, for example a screw driver, said extension wall portion being transversal to said back wall.

Said wall portion may be formed by an inwardly or outwardly bent wall portion of said back wall.

Said wall portion may be provided on each side wall.

Each side wall may have in the region of the widened end of the wedge a hole, the holes of both side walls being in alignment with each other and are adapted to receive a rod or nail.

In order to prevent a deep cutting of the toothed edges into the lattice made of a relatively soft wood the wedge must have cut-limiting surfaces. Therefore each side wall in the region of said toothed edge may have a stamped-out flap which forms said cut-limiting surfaces. The flap may extend inwardly or outwardly of the respective side wall.

Some of the teeth of said toothed edges may be bent relative to said side walls inwardly or outwardly and form said cut-limiting surfaces.

The wedge may have more than two side walls extending normal to the back wall of the wedge so that larger wedge surfaces can be obtained.

Each side wall may be provided with reinforcing corrugations.

The toothed edges may be wavy.

Each tooth in said edges may be of rectangular shape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figures 9, 10:
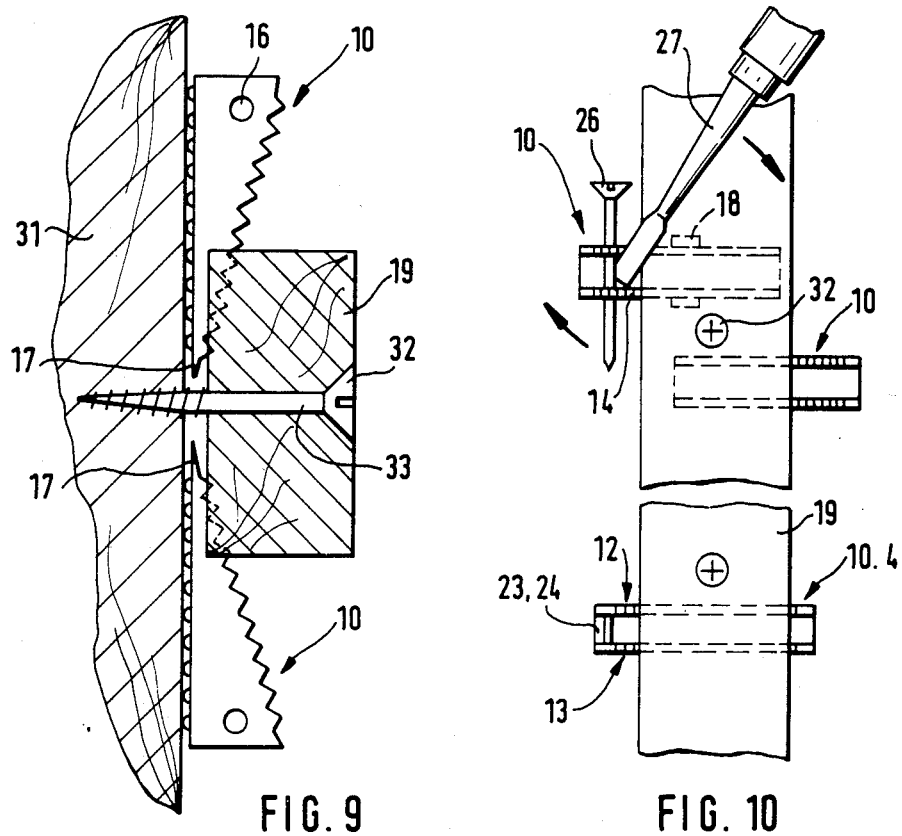
FIG. 9 is a partial sectional view through the lattice substructure with two wedges mounted on the lattice.
FIG. 10 is a top plan view of the lattice structure with the lattice underpinned with the wedges on one of which a tool for releasing the wedge is set.

Referring now to the drawings in detail, wedges 10, 10.1 illustrated in all the figures of the drawings are bent of a sheet stamping. With reference to FIG. 7 it will be seen that wedge 10.5 has a U-shaped profile and has a U-base from which wedge walls 12 and 13 extend perpendicular to back walls 11.1 and 11.2 of the wedge. The free edges 14 of the wedge-shaped walls 12 and 13 are provided in the embodiments of FIGS. 1-7 and 12-16 with teeth. The back side or wall 11 of the wedge, which in assembly faces a wall 31 as shown in FIG. 9, is, in all the embodiments of the present invention, provided with stamped-out portions or projections 15 or transversal knurls. The tip of each wedge ends with a tooth or knife edge 17.

Figure 1:
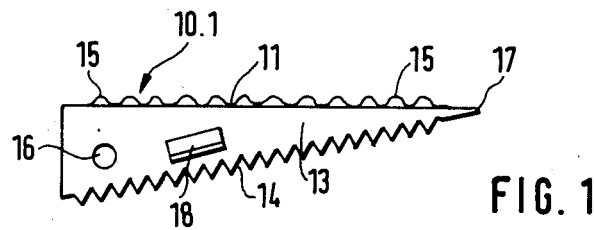
FIG. 1 is a side view of the wedge bent from a punched-out sheet blank, according to a first embodiment of the invention.
Figure 2:
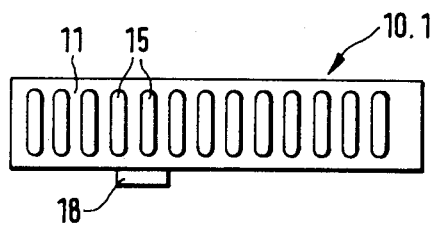
FIG. 2 is a top plan view of the wedge of FIG. 1.
Figure 4:
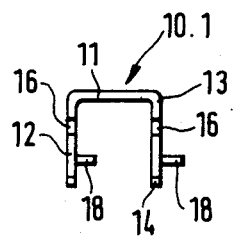
FIG. 4 is a front view of the widened end of the wedge of FIGS. 1 and 2.

As shown in FIG. 1 wedge 10.1, each side wall 12 and 13 is formed in the region of a widened end of the wedge with a hole 16. The holes 16 of the opposing walls 12 and 13 are in alignment with each other. Holes 16 are also provided in the embodiments of FIGS. 3 and 8 to 10. Furthermore, both walls 12 and 13 of the wedges shown in FIGS. 1, 2, and 4 have stamped-out flaps or projections 18 which are bend inwardly or outwardly and provided near the edges having teeth 14. These flaps 18 form cut-limiting surfaces which in turn limit the insertion of the toothed edges of the wedge into a lattice 19 of the lattice substructure and form wedge supporting surfaces as can be seen in FIGS. 8 to 10.

Figures 3, 8:
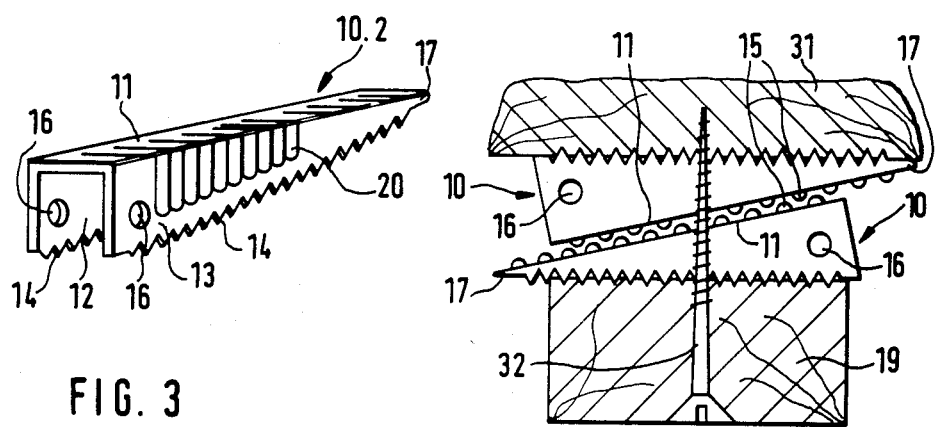
FIG. 3 is a perspective view of a second embodiment of the invention.
FIG. 8 is a partial view of a lattice substructure with two cooperating wedges.

Wedge walls 12 and 13 of wedge 10.2 illustrated in FIG. 3 are reinforced by stiffening corrugations 20.

Figure 5:
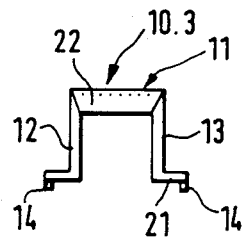
FIG. 5 is a front view of the widened end of the wedge of a third embodiment of the invention.

In the embodiment of FIG. 5 walls 12 and 13 of wedge 10.3 are bent at right angles in the region of the toothed edges to form the cut-limiting surfaces 21. Furthermore, an extension wall portion 22 of the wedge backside 11 is bent inwardly to form a transversal wall.

Figure 6:
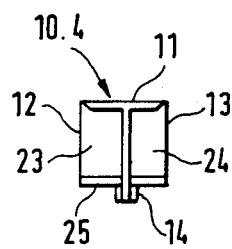
FIG. 6 is a front view of the widened end of the wedge according to a fourth embodiment of the invention.
Figure 7:
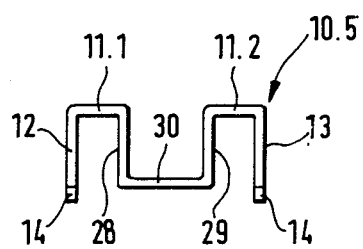
FIG. 7 is a front view of the widened end of the wedge of the fifth embodiment of the invention.

Wedge 10.4 shown in FIG. 6 is formed at the widened end thereof with bent-in portions which form extension regions 23 and 24 or transversal portions of walls 12 and 13. Both wedge walls 12 and 13 in this embodiment are bent at right angles in the regions of toothed edges 14 inwardly to form wedge surfaces 25.

With reference to FIG. 10 it will be seen that holes 16 in wedges 10, 10.1 and 10.2 serve the purpose of receiving therethrough of a nail 26 or any other similar pin or rod in the transversal direction of the wedge. Such transversal rod has the same function as that of transversal wall portions 22 and 23, 24 of wedges 10.3 and 10.4; namely a tool, for example a screw driver 27 can be set on that rod when the driven-in wedge is to be again released or be placed back during the adjustment.

FIG. 7, as has been mentioned above, illustrates wedge 10.5 which is formed by a multiple bending from the sheet stamping so that, in addition to outer walls 12, 13 proviced with toothed edges 14, two additional walls 28 and 29 are formed, between which a large-surface wall portion 30 extends while the backside or wall is subdivided into two backside portions 11.1 and 11.2 lying between walls 12, 13 and 28, 29, respectively.

FIGS. 8 to 11 illustrate various applications of the wedge according to the invention.

FIG. 8 shows two wedges 10 which have wedge backsides 11 lying opposite each other. Wedges 10 are secured against displacement by means of projections or bulges 15 passing one into another and are arranged as a common spacer member between the wall 31 and the lattice 19 of the lattice substructure, anchored in the wall 31 by a screw 32 with an elongated smooth neck.

FIG. 9 depicts two wedges 10 with two opposing sides thereof engaged with the lattice 19. Lattice 19 is secured to wall 31 by means of the screw 32 which has a thread-free neck which is as long as the thickness of the lattice 19.

FIG. 10 shows the top plan view of the lattice with three wedges 10 positioned under the lattice 19 whereby one of the wedges is placed back onto the lattice after the insertion of nail 26 by the screw driver 27 in the above described manner.

Figure 11:
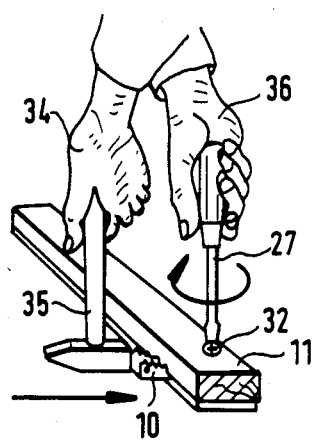
FIG. 11 is the illustration of the adjustment of the lattice of the lattice substructure with the aid of the wedge.

FIG. 11 shows the manner of the adjustment of the lattice 19 by means of wedge 10. An operator normally inserts with his one hand 34 a hammer 35 for driving the wedge 10 and turns with his other hand 36 the screw driver 27 for releasing and tightening the screw 32.

FIGS. 12 through 19 show further embodiments of the wedges 10.6–10.9 which are U-shaped and vary from each other in the constructions of toothed edges 14 of the side walls 12 and 13.

Figure 12:
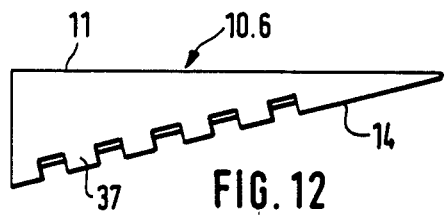
FIG. 12 is a side view of the wedge of the sixth embodiment.
Figures 13, 14:
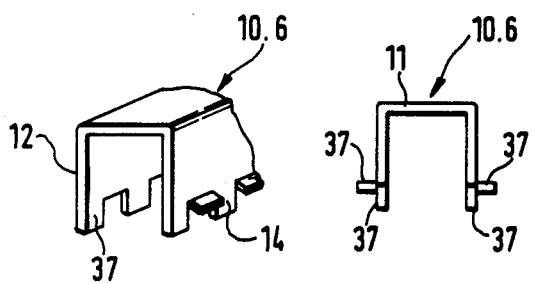
FIG. 13 is a partial perspective view of the wedge of FIG. 12.
FIG. 14 is a front view of the widened end of the wedge of FIG. 12.

Toothed edges 14 of the wedge 10.6 shown in FIGS. 12–14 are provided with rectangular teeth 37, whereby each second tooth 37 is bent outwardly at right angles to the respective wall so as to form cut-limiting surfaces and wedge supporting surface. These outwardly bent teeth are parallel to the back wall 11 of the wedge.

Figure 15:
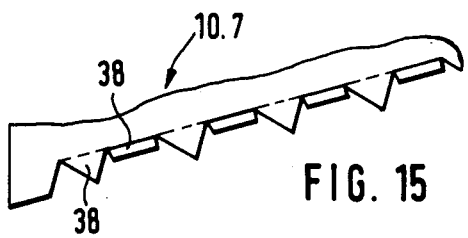
FIG. 15 is a partial side view of the wedge of FIG. 12 with a modified toothed edge.
Figure 16:
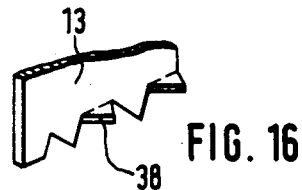
FIG. 16 is a partial perspective view of the widened end of the wedge wall of the wedge of FIG. 15.
Figures 17A, 17B:
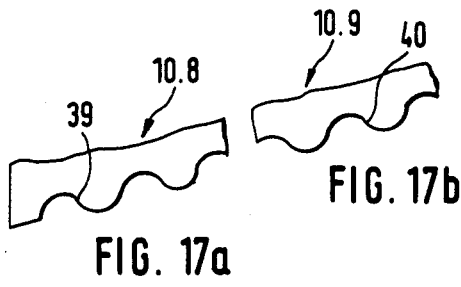
FIGS. 17a and 17b are partial side views of the wedge of FIG. 12 with the wedge walls having further modified edges.
Figures 18A, 18B:
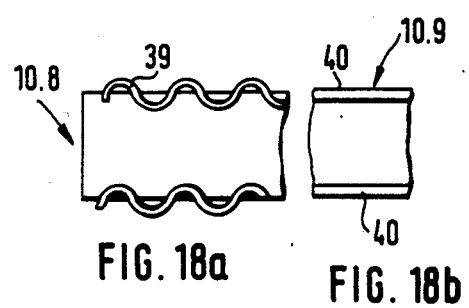
FIGS. 18a and 18b are schematic views of the undersides of the wedges shown in FIGS. 17a and 17b, respectively.
Figure 19:
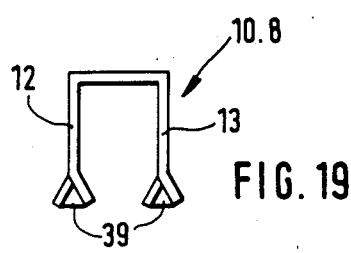
FIG. 19 is a front side of the widened end of the wedge of FIGS. 17a and 17b.

In the embodiment of FIGS. 15 and 16 wedge 10.7 has toothed edges 14 of walls 12 and 13 formed with downwardly projecting angled or tipped teeth alternating with teeth bent outwardly and parallel to the back wall to form cut-limiting surfaces. Wedges 10.6 and 10.7 could be also formed such that teeth 37 and 38 would be alternatingly formed at one and the other side.

Wedges 10.8 and 10.9 illustrated in FIGS. 17a, 18a and 17b, 18b have wavy or corrugated edges 39 or 40. In wedge 10.8, wavy edges 39 are also corrugated opposite to the planes of both walls 12 and 13 so that a wedge profile results shown in FIG. 19.

In the wedge 10.9 with the wavy edge 14 a transverse waviness is not provided.

It will be understood that each of the elements described above, or two or more together, may also find a useful application in other types of wedges for lattice substructures differing from the types described above.

While the invention has been illustrated and described as embodied in a wedge for lattice substructures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wedge for use with lattice substructures of wall panels, comprising side walls and a back wall extending between said side walls, the wedge being bent from a sheet stamping, each side wall having a wedge surface formed at least partially by a bent edge region, each edge region having a toothed edge.

2. The wedge as defined in claim 1, wherein said back wall is formed with corrugations extended transversely relative to a direction of displacement of the wedge.

3. The wedge as defined in claim 1, which has a U-shaped cross-section and includes a base forming said back wall and two legs forming said side walls, said side walls terminating with toothed edges, said side walls being normal to said back wall.

4. The wedge as defined in claim 3, wherein an end of the back wall is terminated with a knife-shaped edge.

5. The wedge as defined in claim 4, and having a widened end; wherein at least one extension wall portion is formed in the region of said widened end for attaching thereto of an adjustment tool, said extension wall portion being transversal to said back wall.

6. The wedge as defined in claim 5, wherein said wall portion is formed by an inwardly bent wall portion of said back wall.

7. The wedge as defined in claim 5, wherein said wall portion is provided on each side wall.

8. The wedge as defined in claim 5, wherein each side wall has in the region of said widened end a hole, the holes of both side walls being in alignment with each other and being adapted to receive a rod or a nail.

9. The wedge as defined in claim 8, and including at least three side walls perpendicular to said back wall.

10. The wedge as defined in claim 5, wherein each side wall in the region of said toothed edge has a stamped-out flap which forms cut-limiting surfaces.

11. The wedge as defined in claim 10, wherein said flap extends inwardly of the side wall.

12. The wedge as defined in claim 10, wherein said flap extends outwardly of the side wall.

13. The wedge as defined in claim 5, wherein some of teeth of said toothed edges are bent relative to said side walls and form cut-limiting surfaces.

14. The wedge as defined in claim 13, wherein said bent teeth are bent inwardly of the side walls.

15. The wedge as defined in claim 13, wherein said bent teeth are bent outwardly of the side walls.

16. The wedge as defined in claim 5, wherein each side wall is provided with reinforcing corrugations.

17. The wedge as defined in claim 5, wherein said toothed edges are wavy.

18. The wedge as defined in claim 5, wherein teeth of said toothed edges are rectangular.

* * * * *